United States Patent [19]

Reichner et al.

[11] Patent Number: 5,169,730

[45] Date of Patent: Dec. 8, 1992

[54] ELECTROCHEMICAL CELL APPARATUS HAVING AN EXTERIOR FUEL MIXER NOZZLE

[75] Inventors: Philip Reichner, Plum Borough; Vinod B. Doshi, Monroeville, both of Pa.

[73] Assignee: Westinghouse Electric Corp., Pittsburgh, Pa.

[21] Appl. No.: 559,103

[22] Filed: Jul. 25, 1990

[51] Int. Cl.$^5$ ............................................. H01M 8/06
[52] U.S. Cl. .................................... 429/20; 429/19; 429/26
[58] Field of Search ................. 429/17, 19, 20, 30, 429/31, 26

[56] References Cited

U.S. PATENT DOCUMENTS

| | | | |
|---|---|---|---|
| 3,718,506 | 2/1973 | Fischer et al. | 136/86 C |
| 4,395,468 | 7/1983 | Isenberg | 429/31 |
| 4,490,444 | 12/1984 | Isenberg | 429/31 |
| 4,729,931 | 3/1988 | Grimble | 429/17 |
| 4,808,491 | 2/1989 | Reichner | 429/13 |

Primary Examiner—R. Bruce Breneman
Attorney, Agent, or Firm—Daniel P. Cillo

[57] ABSTRACT

An electrochemical apparatus (10) is made having a generator section (22) containing electrochemical cells (16), a fresh gaseous feed fuel inlet (28), a gaseous feed oxidant inlet (30), and at least one hot gaseous spent fuel recirculation channel (46), where the spent fuel recirculation channel (46), a portion of which is in contact with the outside of a mixer chamber (52), passes from the generator chamber (22) to combine with the fresh feed fuel inlet (28) at the entrance to the mixer chamber, and a mixer nozzle (50) is located at the entrance to the mixer chamber, where the mixer chamber (52) connects with the reforming chamber (54), and where the mixer-diffuser chamber (52) and mixer nozzle (50) are exterior to and spaced apart from the combustion chamber (24), and the generator chamber (22), and the mixer nozzle (50) can operate below 400° C.

18 Claims, 2 Drawing Sheets

ELECTROCHEMICAL CELL APPARATUS HAVING AN EXTERIOR FUEL MIXER NOZZLE

GOVERNMENT CONTRACT

The Government of the United States of America has rights in the invention pursuant to Contract No. DE-c AC21-80ET-17089, awarded by the United States Department of Energy.

BACKGROUND OF THE INVENTION

This invention relates to an electrochemical apparatus containing a plurality of electrochemical cells, each having an exterior fuel electrode, which can be contacted by a gaseous mixture of fresh feed fuel and recirculated spent fuel, which mixture contains water vapor and can pass through a reforming material prior to contacting the fuel electrodes; where recirculated, hot spent fuel heats the reforming material and the gaseous mixture, and fresh feed fuel and recirculated spent fuel can be mixed, at an ejector exterior to the body of the apparatus, with ejector and fresh feed fuel temperatures not exceeding 400° C.

High temperature, solid oxide electrolyte fuel cell generator apparatus and fuel cell configurations are well known, and taught, for example, in U.S. Pat. Nos. 4,395,468 and 4,490,444, respectively, (Isenberg). There, feed fuel, either $H_2+CO$, or previously reformed natural gas, is fed into the apparatus at one end and flows parallel to exterior fuel electrode surfaces of the elongated fuel cells. Spent fuel is combusted with spent oxidant in a separate chamber and then exits the apparatus.

Other high temperature fuel cell generator apparatus designs are known, where spent fuel is recirculated and aspirated into fresh, preheated feed fuel, in the center of the apparatus, at apparent temperatures of approximately 600° C. to 800° C., which mixture is fed through the fuel cells, as taught in U.S. Pat. No. 3,718,506 (Fischer et al.). There, spent fuel exiting from the fuel cells, is mixed with fresh feed fuel, such as propane, at a jet-pump nozzle, for flow from one end to the other of the series-connected fuel cells. This combination of spent fuel with fresh fuel prevents soot formation within the cells. Additional spent fuel mixes with spent air and flows around and through a catalytic afterburner structure surrounding the fuel cells for complete combustion, which heats the fuel cells, allowing efficient operation at approximately 800° C. In U.S. Pat. No. 4,729,931 (Grimble), spent fuel and combusted fuel are mixed, and then drawn into fresh feed fuel at an ejector nozzle, in an exterior chamber of the generator apparatus. The entire mixture then passes through a reforming material, located in the same chamber as the ejector, to form a reformed gas which is fed to contact fuel cells within the apparatus.

Another generator design, to prevent chilling of the fuel cell, is taught in U.S. Pat. No. 4,808,491 (Reichner), where a combusted exhaust of spent fuel and spent oxidant provides corner heating in the generator apparatus. There, fresh feed fuel is fed into a manifold at the bottom of the apparatus, the bottom of which manifold may contain reforming catalyst and may be heated by the combusted exhaust. The feed fuel then flows parallel to the exterior fuel electrode surfaces of the elongated fuel cells. The fresh feed fuel is not mixed with any spent gases within the apparatus.

Natural gas (methane plus ethane, propane, butane and nitrogen) is a likely fuel for many of these fuel cell apparatus. This natural gas must be reformed, that is, converted to carbon monoxide and hydrogen, through the use of a catalyst and excess water vapor, prior to its utilization in the fuel cell. The reforming reaction is endothermic, requiring a supply of heat, and is best performed at temperatures close to 900° C. The heat required for reforming is a significant fraction of the excess heat that results from fuel cell operation.

The use of recirculated spent fuel to provide water vapor and $CO_2$ for fresh feed fuel, by means of an ejector powered by the inlet fresh fuel pressure, has the potential to result in several problems. The ejector in the typical fuel cell apparatus is located directly in the hot fuel cell environment and is bathed by the hot recirculation gas stream, and the nozzle must be insulated or cooled to prevent carbon deposition from natural gas feed fuel, due to "cracking" which occurs at temperatures above about 400° C.

Also, contaminants, such as silica from the nozzle's thermal insulation, or from other generator insulation, picked up and carried by the spent fuel stream, can cause deactivation of the reformer catalyst. The high temperature, due to ejector and reformer location in the hot recirculation gas stream, also requires a permanently-welded assembly of the ejector into the recirculation ducting, to provide adequate sealing, thus increasing fabrication difficulty and impeding access for maintenance. Thus, carbon deposition, silica transport and high temperature sealing are areas of concern for efficient reformation with recirculation.

What is needed is an apparatus which eliminates carbon deposition concerns at the fresh feed fuel-recirculation gas mixing point, and eliminates the need for high temperature sealing, but which also allows heat exchange to a reformer compartment or material. It is one of the main objects of this invention to provide such an apparatus.

SUMMARY OF THE INVENTION

Accordingly, the invention generally resides in an electrochemical apparatus, where fresh feed fuel gas is reacted to provide hot spent fuel gas, characterized in that the apparatus contains: means to mix fresh feed fuel gas with hot spent fuel gas at an ejector exterior to the main body of the apparatus, to provide reformable fuel mixture; means to reform the mixture by passage through a reforming chamber containing reforming material; and means to heat the reforming chamber by contact with hot spent fuel gas.

The invention more specifically resides in an electrochemical apparatus having a fresh gaseous feed fuel inlet, gaseous feed oxidant inlet, hot gaseous spent fuel recirculation channel, separate combusted exhaust gas exit channel, a generator chamber containing a plurality of electrochemical cells, each cell having an exterior fuel electrode and an interior air electrode, a combustion chamber, and a reforming chamber containing a reforming material; characterized in that, the hot spent fuel recirculation channel, a portion of which is in contact with the outside of a mixer chamber, passes from the generator chamber to combine with the fresh feed fuel inlet at the entrance to the mixer chamber, and a mixer nozzle is located at the entrance to the mixer chamber, where the mixer chamber exit connects with the reforming chamber and reformed fuel entry ports connect the reforming chamber to the generator chamber, and where the mixer chamber and mixer nozzle are exterior to the main body of the apparatus and substantially spaced apart from the combustion chamber and the generator chamber. Preferably, the mixer nozzle can operate at a low temperature below 400° C. The invention also resides in that a portion of the combusted exhaust gas exit channel also contacts the reforming chamber, allowing heat transfer between said channel and reforming chamber.

The invention further resides in a high temperature electrochemical apparatus, operating with a gaseous oxidant and a fresh gaseous feed fuel, having a fresh gaseous feed fuel inlet, gaseous feed oxidant inlet, hot gaseous spent fuel exit channel, and separate combusted exhaust gas recirculation channel, a generator chamber containing a plurality of electrochemical cells, each cell having an exterior fuel electrode and an interior air electrode, a combustion chamber where hot gaseous spent fuel and hot gaseous spent oxidant combust to form combusted exhaust gas, and a reforming chamber containing reforming material; characterized in that a portion of hot spent fuel from the generator chamber is fed through the hot spent fuel recirculation channel to contact the outside of a mixer chamber, causing heat transfer from the hot spent fuel to the mixer chamber, and where fresh feed fuel mixes with hot spent fuel at a mixer nozzle, located at the entrance to the mixer chamber, after the hot spent fuel contacts the outside of the mixer chamber, and the mixture of the two pass into the mixer chamber to be heated by hot spent fuel and then pass through the reforming material in the reforming chamber and then pass into the generating chamber, and where the mixer chamber and mixer nozzle are exterior to the main body of the apparatus and substantially spaced apart from the combustion chamber and the generator chamber. Preferably, the mixer nozzle operates at a low temperature below 400° C. The invention also resides in that a portion of the combusted exhaust gas also contacts the reforming chamber, allowing heat transfer between said gas and reforming chamber.

The term "fuel electrode" as used herein means that electrode in contact with fuel, the term "air electrode" as used herein means that electrode in contact with air or oxygen, and the term "spent" fuel, oxidant, or air as used herein means partially reacted, low BTU fuel or partially reacted, depleted gaseous oxidant, or depleted air containing about 5% to 15% oxygen. The term "spent" fuel does not include the mixture of spent fuel combusted with spent oxidant or air, which mixture is herein defined as "combusted exhaust gas".

The relocation of the mixer, and the mixer nozzle (ejector nozzle) to a low-temperature position eliminates the need for forced cooling of the nozzle. The ducts which carry the recirculating spent fuel and which are in contact with the reforming chamber, and the ducts which carry the fuel mixture through the reforming material, may be concentric, with heat conduction fins providing optimum heat exchange between the two gas streams. This heat exchange minimizes energy loss from the heat capacity of the hot extracted spent fuel, while allowing the nozzle temperature of the ejector, and therefore of the fresh fuel to remain below the 400° C. limit above which carbon deposition has been observed.

BRIEF DESCRIPTION OF THE DRAWINGS

In order that the invention can be more clearly understood, conventional embodiments thereof will now be described, by way of example, with reference to the accompanying drawings, in which.

DESCRIPTION OF THE PREFERRED EMBODIMENTS

Figure 1:
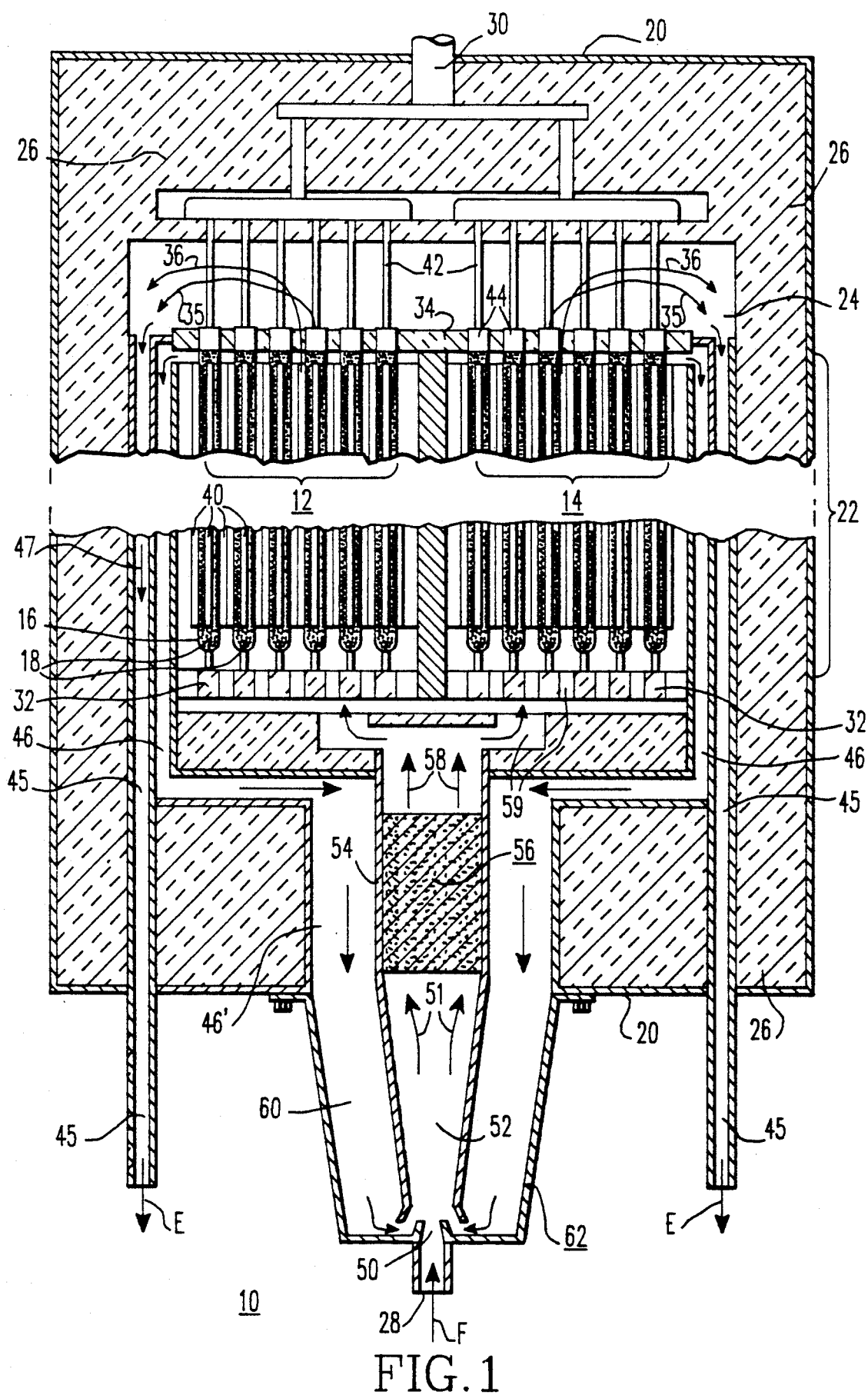
FIG. 1 is a side view in section of one embodiment of an electrochemical cell apparatus according to this invention, showing extraction of recirculated spent fuel, mixture of this spent fuel with incoming fresh feed fuel via an external ejector, and passage to a reformer from which the reformed fuel passes into the apparatus.

Referring now to FIG. 1, an electrochemical cell apparatus or generator 10 is shown containing two cell bundles 12 and 14, each bundle containing a plurality of parallel, axially elongated electrochemical cells 16, such as solid oxide fuel cells. The cells are located in generator compartment or section 22. Each cell has an exterior fuel electrode 18 covering its surface, shown dotted for the sake of clarity, an interior air electrode, and a solid oxide electrolyte between the electrodes (air electrode and electrolyte not shown), as is well known in the art. The air electrode is generally a doped ceramic of the perovskite family, for example, doped $LaMnO_3$, the electrolyte is generally yttria stabilized zirconia, and the fuel electrode is generally a zirconia-nickel cermet material. A calcia stabilized zirconia support for the air electrode can also be used. For a detailed description of the materials and construction of an exemplary fuel cell, reference can be made to U.S. Pat. No. 4,490,444, herein incorporated by reference.

The electrochemical cell apparatus 10 will operate with an interior temperature in the range of about 600° C. to about 1,200° C. An outer housing 20 surrounds the entire apparatus. The housing is preferably comprised of a high temperature resistant metal such as Inconel. Thermal insulation 26, such as low density alumina is contained within the outer housing as shown. Penetrating the housing 20 and insulation 26 is fresh gaseous feed fuel inlet 28, the fresh feed fuel shown as F, and gaseous oxidant, such as air or oxygen, feed 30, as well as ports for electrical leads and the like, not shown. The generator chamber 22 extends between wall 32 and a porous barrier 34. The porous barrier 34 need not be a sealed structure. The porous barrier 34, in particular, is designed to allow spent fuel gas flow, indicated by arrows 36, from the generator chamber 22, operating at a pressure slightly above atmospheric, to the combustion chamber 24, operating at a slightly lower pressure, where the spent gas combines with spent oxidant 33, forming exhaust gas which passes through channel 45.

High temperature, elongated, solid oxide electrolyte cells 16 extend between the combustion chamber 24 and the wall 32. The cells have open ends 44 in the combustion chamber 24, and closed ends in the generator chamber 22 near wall 32. Each individual cell generates approximately one volt on open circuit, and a plurality are electrically interconnected through conducting felts 40, usually nickel fiber metal, preferably in a series-parallel rectangular array, as described in U.S. Pat. No. 4,395,468, herein incorporated by reference.

By way of example, during operation, a gaseous oxidant, such as air, is fed through oxidant feed inlet 30, and enters the oxidant feed conduits 42 at a temperature of approximately 500° C. to 700° C., and a pressure above atmospheric, being optionally heated prior to entering the housing by conventional means, such as a heat exchanger coupled with a blower. The oxidant, within the conduits, is passed through the combustion chamber 24, where it is further heated to a temperature of approximately 800° C. to 900° C. by the combusted exhaust gas. The oxidant then flows through the length of the oxidant circuit, through the conduits 42 which extend down the inside length of the fuel cells, being further heated to approximately 1,000° C., by virtue of absorbing most of the heat generated during the electrochemical reaction. A smaller fraction of the heat is absorbed by the fuel.

The oxidant is discharged into the closed end bottom of the fuel cells 16. The oxidant within the fuel cells reverses direction, and electrochemically reacts at the inner air electrode along the inside active length of the cells, depleting somewhat in oxygen content as it approaches the open ends 44 of the cells. The depleted oxidant is then discharged into the combustion chamber 24 through the open cell ends 44, and is shown as spent oxidant streams 35. This spent oxidant combusts with depleted fuel, where part of the total depleted fuel passes through porous barrier 34 as shown by arrows 36, to form combusted exhaust gas 47, which exits the apparatus through combusted exhaust gas exit channels 45, finally exiting as exhaust gas E. The channels 45 can be made of a high temperature resistant metal, such as Inconel.

In this invention, a gaseous fuel that has not yet been reformed, such as a gaseous hydrocarbon, including hydrocarbons such as methane ($CH_4$), ethane ($C_2H_6$), propane ($C_3H_8$), and the like, vaporized petroleum fractions such as naphtha, and alcohols, such as ethyl alcohol ($C_2H_5OH$), and the like, and natural gas, typically a mixture of 85% methane and 10% ethane with a balance of propane, butane and nitrogen, can be used. These reformable fuel mediums F are fed into the generator through fresh feed fuel inlet 28.

In this invention, a major portion of the hot gaseous spent fuel formed along the axial length of the cells 16 passes to at least one hot spent fuel recirculation channel 46, which can be made of a high temperature resistant metal such as Inconel. Another portion of the hot spent fuel passes into combustion chamber 24, shown as arrows 36, as previously described, to combust with spent air, shown as arrow 35, and preheat the fresh oxidant feed.

The hot spent fuel exit channel 46 passes from the generator chamber 22 to feed into and combine with the fresh feed fuel inlet at the entrance to the mixer means or chamber 52, at a mixer nozzle 50, which can be of any type known in the art, for example, an ejector, jet pump, aspirator, or the like. This mixer nozzle 50 is located at the entrance to the mixer-diffuser chamber 52. This allows recirculation of the portion of the spent fuel fed into channel 46 to mix with the fresh feed fuel at mixer nozzle 50, to provide a reformable fuel mixture of the two gases, shown by arrows 51. The geometry of the ejector/ mixer is further designed such that the dynamic energy of the fuel at the nozzle 50 is effectively converted to an elevated pressure at entrance to the reforming chamber 54. This is preferably accomplished by a diffuser, the cross-sectional area of which gets larger as it proceeds from its entrance near nozzle 50, to the reforming chamber 54, in one fashion as shown.

The reformable fuel mixture 51 will contain at least water vapor (steam) and usually also $H_2$, CO, and $CO_2$, all contributed by the spent fuel that enters mixer-diffuser chamber 52. Preferably, the volume ratio of spent fuel to fresh feed fuel will be adjusted by the velocity of the fresh feed fuel input so that approximately 2 volumes to 5 volumes of water vapor and $CO_2$ are added to each volume of fresh feed fuel. The presence of water vapor plus a reforming catalyst, most commonly Ni, allows conversion of gaseous hydrocarbons to $CO+H_2$, by the reaction:

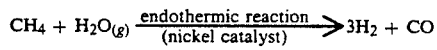
$$CH_4 + H_2O_{(g)} \xrightarrow[\text{(nickel catalyst)}]{\text{endothermic reaction}} 3H_2 + CO$$

A similar fuel conversion reaction to $H_2$ and CO is accomplished with $CO_2$ in place of water vapor.

The reformable fuel mixture 51 then passes from the mixer chamber exit into and through a cylindrical reforming means or chamber 54 containing reforming material 56, such as nickel, or the like, or other well-known useful reforming material for fuel gas. The design shown in FIG. 2 for the reforming chamber 54 is an annular, concentric, vessel surrounding the hot spent fuel inlet 46'. This design is generally used when combusted exhaust gas from channel 45 is channeled to contact the reforming chamber and entails a crossover of gases from chambers 46' and 52. In both embodiments shown in FIG. 1 and FIG. 2, the reformed fuel mixture, shown by arrows 58, after having just passed from the mixer-diffuser chamber 52, upward into the reforming chamber 54, and through the reforming material 56, passes directly upward through a series of reformed fuel entry ports 59, which connect the reforming chamber to the generator chamber 22, and then into the generator chamber of the apparatus.

At the reforming chamber 54, hot spent fuel from channel 46 reaches channel 46' at a temperature of approximately 1,000° C. Channel 46', in contact with the reforming chamber 54, allows a means of heat transfer between hot gas in that channel and chamber 54. This reduces the spent fuel temperature and provides heat for the endothermic reforming reaction. With regard to the reformer 54, complete reforming of the fuel is not necessary since some internal reforming of the reformable fuel mixture by the nickel fiber felts 40, or on the nickel cermet surface 18 of the fuel cells within the generator chamber 22, can be utilized to keep the amount of reforming material 56 relatively small, and allow internal reformer 54 inclusion within the apparatus 10 if desirable.

Figure 2:
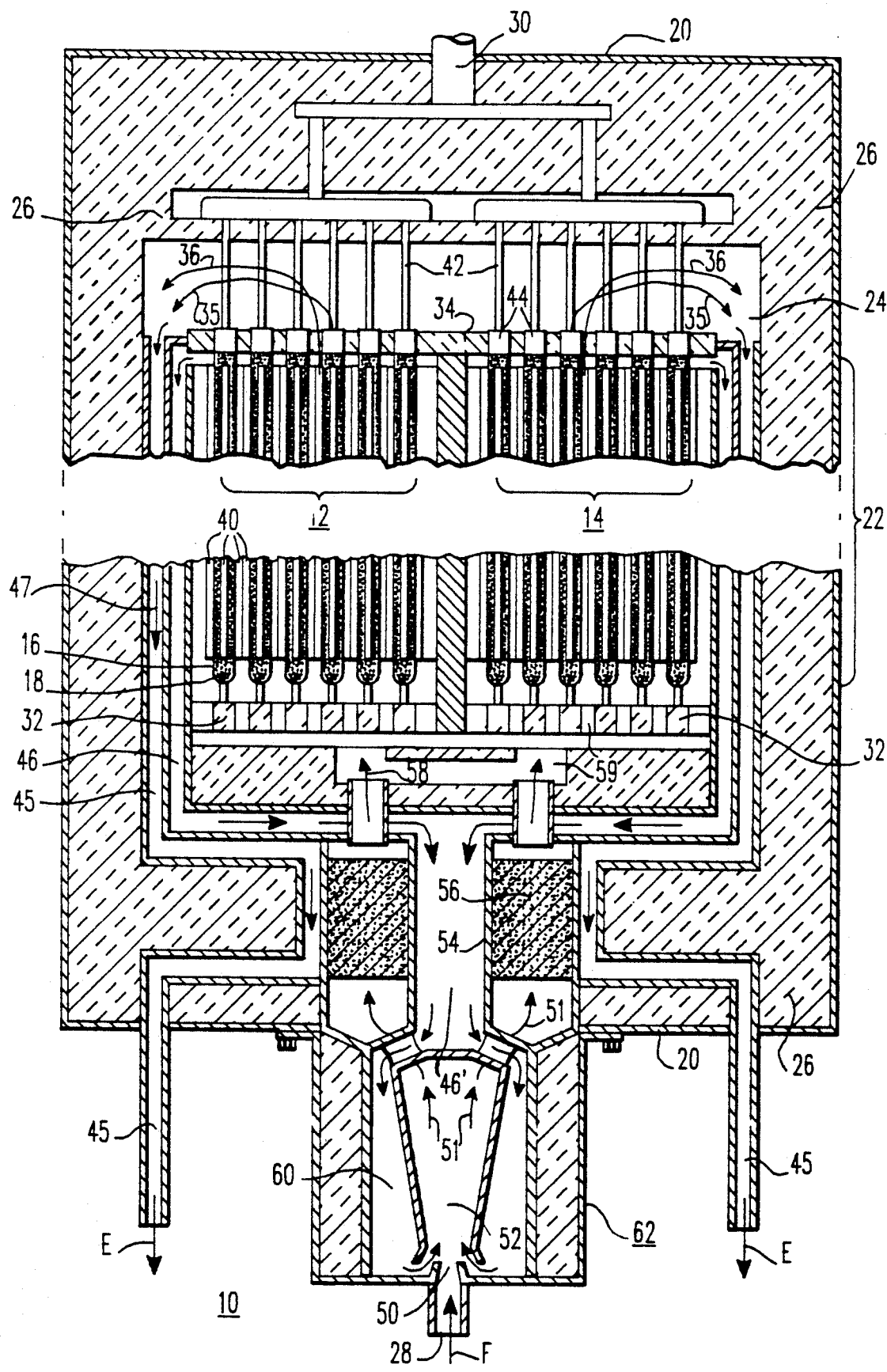
FIG. 2 is a side view in section of an apparatus similar to that of FIG. 1, but with a different gas flow pattern.

Additionally, spent fuel passes from channel 46', down, around, and in contact with the outside of mixer-diffuser chamber 52 with a further loss of heat which is transferred to the reformable fuel mixture 51 as it approaches the reformer 56. As shown in both FIG. 1 and FIG. 2, the spent fuel within nozzle feed channel 60, which is an extension of channel 46', is fed to contact the mixer-diffuser chamber 52, which chamber has upward flowing reformable fuel mixture 51 therein, allowing heat transfer from the channel 60 and hot spent fuel to the mixer chamber and gas therein. This reformable fuel mixture 52 continues upward toward the reforming chamber and generator chamber. In the embodiments shown, the temperature of the spent fuel drops from approximately 1,000° C. at the entrance to channel 46', to a sufficiently low temperature as it approaches the nozzle 50 such that the fresh fuel in the mixer chamber 52 will not exceed 400° C. The combusted exhaust gas E in separate channels 45 as shown in the drawing passes out of the apparatus at approximately 800° C.; or if the combusted exhaust gas is first used to provide additional heat for the reformer, as shown in FIG. 2, it would exit at about 650° C.

As can be seen in both Drawings, the entire mixer nozzle-mixer chamber subassembly 62 is essentially, exteriorly bolted onto the electrochemical apparatus 10. Thus, the mixer-diffuser chamber 52 and mixer nozzle 50, while part of the electrochemical apparatus, are exterior to the main body of the apparatus and substantially spaced apart from the rest of the apparatus, and the combustion chamber 24 and the generator chamber 22. Thus, the mixer nozzle 50 can operate at below approximately 400° C., which would be the approximate temperature at the mixer nozzle 50 and entrance to the mixer chamber 52.

Thus, the mixer nozzle is extended by gaseous component ducts or channels to a position remote from the high-temperature active generating and combusting region of the apparatus, and can operate at a sufficiently low temperature to prevent carbon deposition. Also, the gaseous component ducts or channels are coupled or arranged in a manner to facilitate heat exchange from hot spent fuel to a reformable fuel mixture, thus conserving much of the thermal energy of the recirculating fuel gas, while maintaining a low nozzle temperature to prevent carbon deposition. This combination, coupled with reformer contact allows utilization of the high temperature spent fuel gas to provide the endothermic energy requirement of the reforming reaction. Finally, the primary gas seals can be extended and located in a colder region and allow ease of disassembly and replacement of the subassembly 62 as a cartridge unit.

We claim:

1. An electrochemical apparatus comprising: (1) a fresh gaseous feed fuel inlet, (2) gaseous feed oxidant inlet, (3) hot gaseous spent fuel recirculation channel, (4) separate combusted exhaust gas exit channel, (5) a generator chamber containing a plurality of electrochemical cells, each cell having an exterior fuel electrode and an interior air electrode, (6) a combustion chamber, and (7) a reforming chamber containing a reforming material; where the hot spent fuel recirculation channel, a portion of which is in contact with and in heat transfer relationship to the reforming chamber and a portion of which is in contact with the outside of a mixer chamber, passes from the generator chamber to combine with the fresh feed fuel inlet at the entrance to the mixer chamber, and a mixer nozzle is located at the entrance to the mixer chamber, where the mixer chamber exit connects with the reforming chamber and reformed fuel entry ports connect the reforming chamber to the generator chamber, where the separate combusted exhaust gas exit channel exits the apparatus, and where the mixer chamber and mixer nozzle are exterior to the main body of the apparatus and substantially spaced apart from the combustion chamber and the generator chamber.

2. The apparatus of claim 1, where the chambers are within a metal housing lined with insulation.

3. The apparatus of claim 1, where the electrochemical cells are fuel cells, the fresh gaseous feed fuel is natural gas, the air electrode contains doped $LaMnO_3$, the electrolyte is yttria stabilized zirconia and the fuel electrode contains a zirconia-nickel cermet material.

4. The apparatus of claim 1, where the mixer nozzle is an ejector mechanism.

5. The apparatus of claim 1, where catalytic reforming material is also on the cells.

6. The apparatus of claim 1, where the mixer chamber and mixer nozzle are in the form of a replaceable subassembly cartridge unit.

7. The apparatus of claim 1, where a portion of the combusted exhaust gas exit channel contacts the outside of the reforming chamber.

8. A high temperature electrochemical apparatus, operating with a gaseous oxidant and a fresh gaseous feed fuel, comprising: a fresh gaseous feed fuel inlet, gaseous feed oxidant inlet, hot gaseous spent fuel recirculation channel, and separate combusted exhaust gas exit channel, a generator chamber containing a plurality of electrochemical cells, each cell having an exterior fuel electrode and an interior air electrode, a combustion chamber where hot gaseous spent fuel and hot gaseous spent oxidant combust to form combusted exhaust gas, and a reforming chamber containing reforming material; where a portion of hot spent fuel from the generator chamber is fed through the hot spent fuel recirculation channel to contact the reforming chamber and the outside of a mixer chamber, causing heat transfer from the hot spent fuel to the reforming chamber and the mixer chamber, and where fresh feed fuel mixes with hot spent fuel at a mixer nozzle, located at the entrance to the mixer chamber, after the hot spent fuel contacts the outside of the mixer chamber, and the mixture of the two pass into the mixer chamber to be heated by hot spent fuel and then pass through the reforming material in the reforming chamber and then pass into the generating chamber, where the combusted exhaust gas exits the apparatus, and where the mixer chamber and mixer nozzle are exterior to the main body of the apparatus and substantially spaced apart from the combustion chamber and the generator chamber.

9. The apparatus of claim 8, where the chambers are within a metal housing lined with insulation.

10. The apparatus of claim 8, where the electrochemical cells are fuel cells, the fresh gaseous feed fuel is natural gas, the air electrode contains doped $LaMnO_3$, the electrolyte is yttria stabilized zirconia and the fuel electrode contains a zirconia-nickel cermet material.

11. The apparatus of claim 8, where the mixer nozzle is an ejector mechanism.

12. The apparatus of claim 8, where catalytic reforming material is also on the cells.

13. The apparatus of claim 8, where the mixer chamber and mixer nozzle are in the form of a replaceable subassembly cartridge unit.

14. The apparatus of claim 8, where combusted exhaust gas contacts the outside of the reforming chamber causing heat transfer from the combusted exhaust gas to the reforming chamber.

15. The apparatus of claim 1, in a system also containing a heat exchanger and a blower associated with the gaseous feed oxidant inlet.

16. The apparatus of claim 8, in a system also containing a heat exchanger and a blower to heat gaseous feed oxidant before entry into the apparatus.

17. The apparatus of claim 8, where the mixture of fresh feed fuel and hot spent fuel contains water vapor and $CO_2$, where about 2 volumes to 5 volumes of water vapor and $CO_2$ are added to each volume of fresh feed fuel.

18. The apparatus of claim 8, where the temperature of the hot spent fuel drops sufficiently as it approaches the mixer nozzle such that the fresh fuel in the mixer chamber will not exceed 400° C.

* * * * *